July 3, 1951        A. A. RANDOLPH        2,559,029
REMOVABLE VEHICLE BODY
Filed Jan. 9, 1950                             2 Sheets—Sheet 1
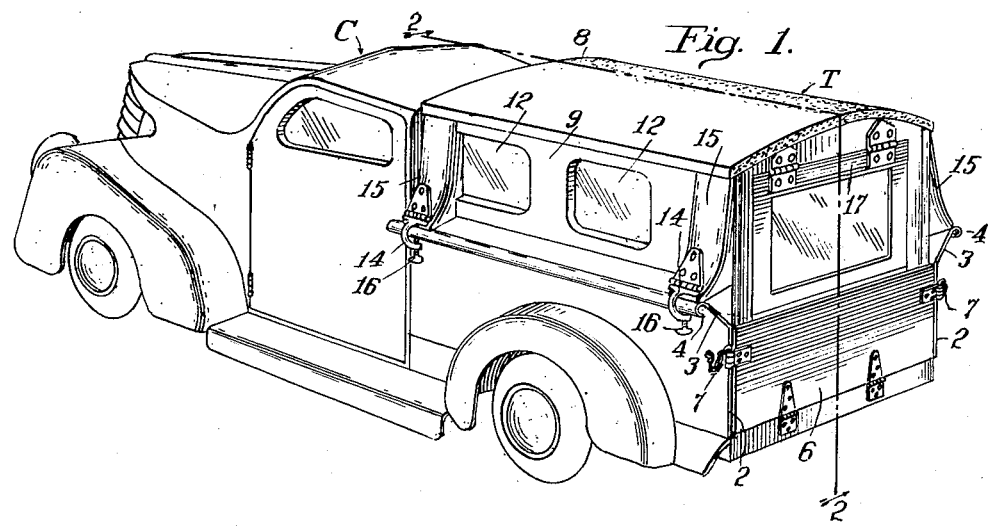
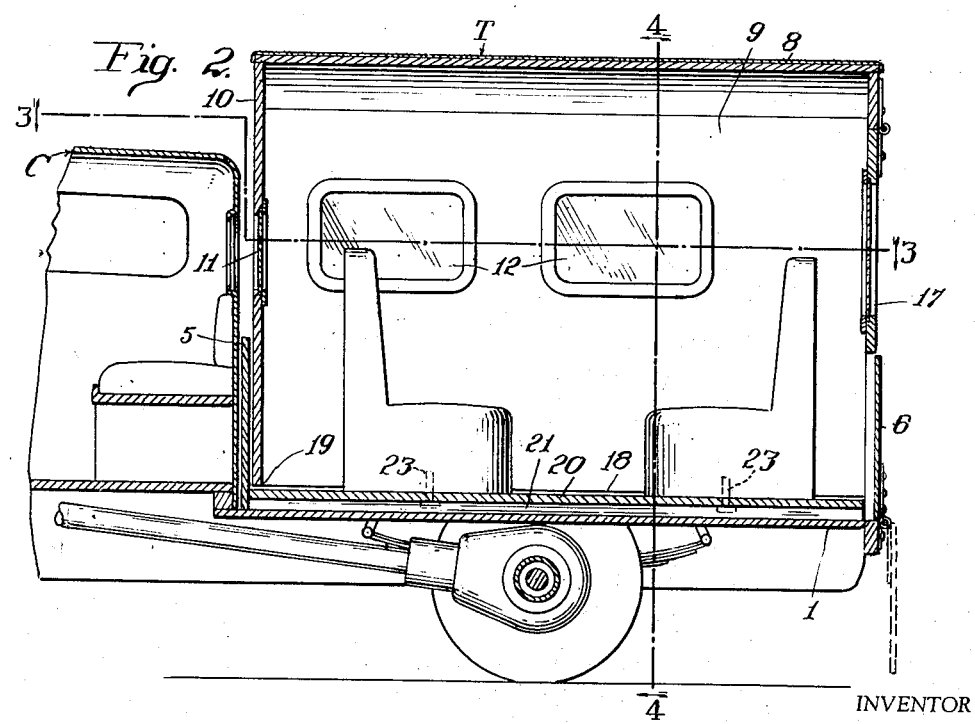
INVENTOR
*Albert A. Randolph*
BY     *Babcock & Babcock*
ATTORNEYS July 3, 1951      A. A. RANDOLPH      2,559,029
REMOVABLE VEHICLE BODY
Filed Jan. 9, 1950      2 Sheets-Sheet 2
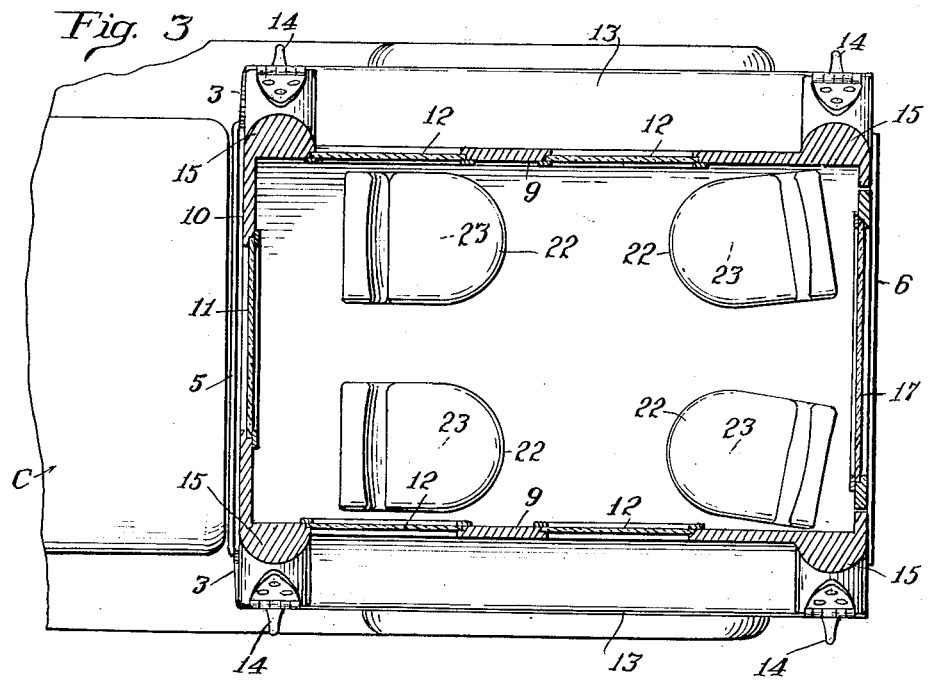
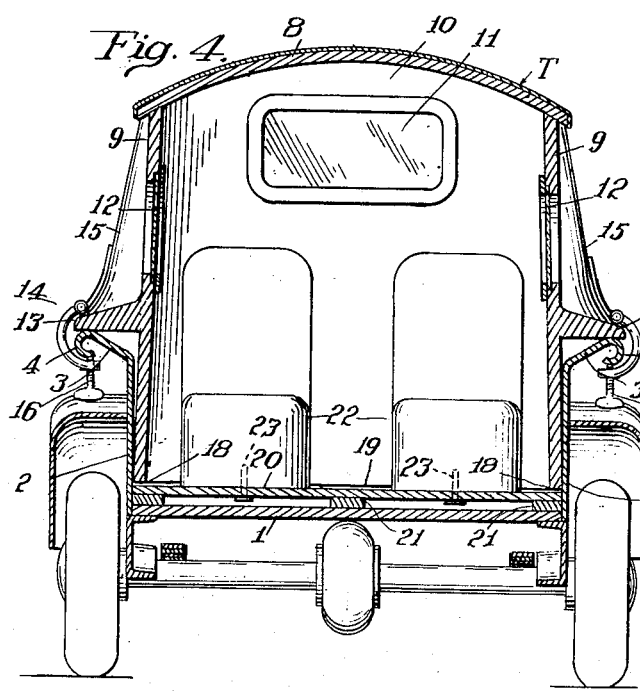
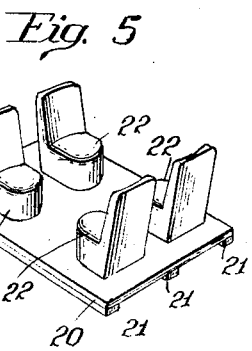
INVENTOR
Albert A. Randolph
BY Babcock & Babcock
ATTORNEYS Patented July 3, 1951

2,559,029

UNITED STATES PATENT OFFICE 2,559,029

REMOVABLE VEHICLE BODY

Albert A. Randolph, Glenmora, La.

Application January 9, 1950, Serial No. 137,530

2 Claims. (Cl. 296—24)

1

This invention relates to a removable vehicle body for use in converting the cargo space of a truck for comfortable passenger use, and has for its primary objects: to provide such a body in which the mode of assembly thereof to a truck is extremely simplified, and which requires no alterations whatsoever to the truck in order to adapt the latter for use with my invention; to provide such a removable body which provides a clean interior for passengers regardless of the condition of cleanliness of the truck cargo space or compartment in which it is disposed; and, to provide such a body which is capable of more versatile use than prior devices of a generally similar nature.

With this in mind, an important feature of my invention resides in the embodiment therein of relatively separable tonneau and a seat bearing floor panel, the arrangement being such that the tonneau after being assembled on the truck body coacts therewith to provide a guide means facilitating the subsequent assembly of the floor panel and thereafter maintain said floor panel and seats against vertical displacement or bouncing when the truck is in motion. A further important feature of the invention resides in the arrangement of the foregoing components of the passenger body so that either may be applied or removed independently of the other by longitudinal sliding movement.

In this application I show and describe only the preferred embodiment of my invention, simply by way of illustration of the practice thereof as by law required. However I recognize that my invention is capable of other and different uses and that the several details thereof may be modified in various ways, all without departing from my said invention. Therefore the drawings and description herein are to be considered as merely illustrative and not as exclusive.

In the accompanying drawings wherein I have illustrated the preferred embodiment of the invention:

Figure 1 represents a perspective view of a pick-up truck having the invention applied thereto;

Figure 2, a relatively enlarged longitudinal section on the line 2—2 of Figure 1, looking in the direction of the arrows, the front portion of the truck being broken away;

Figure 3, horizontal section on the line 3—3 of Figure 2, looking in the direction of the arrows, the front part of the truck being shown only fragmentarily;

2

Figure 4, a cross-section on the line 4—4 of Figure 2, looking in the direction of the arrows; and, Figure 5, a reduced scale perspective view of the passenger floor panel and seat construction of the invention.

Referring now in detail to the accompanying drawings, my invention is shown therein as applied to a conventional truck, preferably of the "pick-up" type having a cargo compartment rearwardly of the truck cab C defined by a horizontal cargo floor 1, relatively laterally opposed upstanding parallel sides 2, the upper portions 3 of which preferably flare laterally outwardly and are provided with smooth horizontal upper edges defined by edge beadings 4, and relatively longitudinally opposed ends 5 and 6 respectively, the rear end 6 comprising a usual rearwardly opening hinged tail gate adapted to be normally maintained in upwardly swung closed position by conventional means 7 as shown.

The foregoing construction is conventional and is therefore not claimed as my invention, but is thus briefly referred to merely in order to promote a rapid and clear understanding of my invention.

Removably disposed on the cargo compartment of the truck is a rearwardly opening enclosed tonneau, generally designated T, having a weather proof top or roof 8, laterally opposed parallel sides or side walls 9 and a forward end or end wall 10. Preferably windows 11 and 12 will be disposed in the respective end wall 10 and side walls 9 to provide visibility for occupants or passengers within the tonneau T. The front window 11 will preferably be located so as to be in substantial registry with the rear window of the truck cab C as shown to permit use of a usual rear view mirror by the truck driver.

The tonneau T is supported and preferably longitudinally slidable on the truck sides 9, as by means of longitudinal abutments 13 projecting from the opposite sides 9 of the tonneau and extending preferably for the complete length thereof. The downwardly presented abutment faces of these abutments 13 are smooth and straight in a longitudinal direction so as to be easily longitudinally slidable on the upper edges or edge beadings 4 of the truck sides. Thus, the tonneau may be easily placed in or removed from the truck by longitudinal sliding movement. In order to facilitate its assembly with and disassembly from the truck, the tonneau T will preferably be of light strong construction preferably utilizing commercially available plywood for its wall construction.

C-clamps 14 hinged to the opposite sides of the tonneau at suitable locations, preferably on the corner posts or frame members 15 thereof, exemplify any of various means which may be carried by the tonneau T for securing the latter in position against both vertical and longitudinal displacement on the truck body. Such clamps 14 are laterally swingable in vertical planes about their hinges to and from positions beneath the outwardly flaring portions 3 of the truck sides, and have clamp screws 16 threaded through their free ends to be tightened into engagement with the under surfaces of the flaring portions 3 in obvious manner.

The rearwardly opening rear end of the tonneau is preferably provided with a closure element in the form of a window 17 hinged in its upper portion and swingable to open position when desired. Such a window preferably occupies only that portion of the rear tonneau opening which is located above the tail gate 6 to the truck, and is swingable above the tail gate to open or closed positions. In conjunction with the tail gate, it provides a means for selectively closing the tonneau rear end, and the tail gate 6 and rear window 17 together provide closure means which may be opened to permit the entry and discharge of passengers, as well as to permit assembly of the various parts of the invention with the truck as hereinafter described.

It will be noted that the abutments 13 support the tonneau T with its sides and forward end depending interiorly of and parallel to the sides 2 and front end 5 respectively of the truck cargo compartment, and with the lower edges 18 of the tonneau sides and preferably also the lower edge 19 of the tonneau front end, spaced above and parallel to the cargo floor 1 of the truck. Thus the lower edges 18 of the sides in conjunction with the subjacent surface portions of the floor 1 will define laterally opposed parallel guide grooves for slidably receiving a false floor panel 20 and positioning same against vertical displacement when the truck is in motion.

Such a floor panel 20 may be formed of a sheet of relatively light but strong material, such as plywood, and suitably braced as by longitudinal stringers 21 secured against its under surface. Secured against bodily movement on the upper face of this floor panel 20 are any suitable number of passenger chairs, each designated 22. Each of these chairs or seats 22 will preferably be pivotally connected to the floor panel as at 23, to thus permit passengers seated therein to assume positions facing in various directions as desired.

The chairs 22 are so disposed on the panel 20 that, when the truck tail gate 6 and the rear window 17 of the tonneau are both swung to open position, leaving the rear open end of the tonneau unobstructed, the entire floor panel 20 with its several chairs 22 may be placed in position or withdrawn therefrom through the coincident rear openings of the tonneau and truck, and the tail gate 6 of the truck when raised and fastened in closed position will secure both the floor panel 20 and the tonneau T against endwise displacement relative to the truck body.

In the use of my invention, which is believed to be apparent from the foregoing, in order to assemble same on a truck, the tail gate 6 of the truck is first opened, whereupon the tonneau after being moved into longitudinal alignment with the rear end of the truck is lifted until the forward ends of the abutments 13 rest on the upper edges 4 at the rear ends of the truck sides 2, following which the tonneau may be slid bodily in a forward direction on the upper side edges 4 of the truck body until it abuts against the forward end 5 thereof. The clamps 14 may then be swung into operative position and clamped beneath the outwardly flaring portions 3 of the sides, as best illustrated in Figure 4, to securely fasten the tonneau against both vertical and longitudinal displacement when the truck is in motion.

Following this, the floor panel 20 is similarly positioned behind and in alignment with the truck and its front end is lifted and inserted into the guide grooves between the truck floor 1 and the lower edges 18 of the tonneau sides, whereupon the rear end of the floor panel 20 is lifted and the panel is then shoved bodily into the tonneau along the said guide grooves until its front edge passes beneath the tonneau front wall 10 and into engagement with the front end 5 of the truck cargo compartment. The tonneau rear closure member or window 17, will of course be opened to permit the chairs to pass into the tonneau without obstruction.

Following this, the tail gate 6 of the truck may be raised and secured in closed position in usual manner, and the tonneau rear window 17 swung downwardly to closed position to cooperate with the tail gate in closing and weather proofing the rear end opening of the tonneau T.

In addition to its function as a closure member, it will be apparent that in this arrangement the tail gate 6 will cooperate with the floor panel 20 to prevent rearward displacement of the latter, and will also serve as a secondary or auxiliary means for preventing rearward displacement of the tonneau in the event of failure of the clamps 14 to properly serve this function.

Obviously the tonneau T may be used without the floor panel 20 and its attached chairs 22 when it is desired to use the cargo compartment for carrying various loads which are to be protected from the weather, and similarly the floor panel may be used without the tonneau T, if desired, though in such case there will be no means of restraining the floor panel against vertical movement or bouncing responsive to the movements of the truck in motion, and consequently such an arrangement will be less comfortable to passengers than would the preferred arrangement utilizing the tonneau.

The manner of removing the tonneau T and floor panel 20 from the truck in order to convert same for its normal use will be readily apparent, involving merely a reversal of the assembling steps above described.

From the foregoing it will be apparent that I have provided a new and highly useful removable passenger body or compartment for converting the cargo spaces of trucks to comfortable passenger use. Not only is such an arrangement simple and easily applied or removed from a truck without requiring any alterations to the truck, but also my invention has the advantage that it provides a clean interior for passengers regardless of the condition of cleanliness of the truck cargo compartment in which it is disposed.

I claim:

1. In a pick-up truck of the class wherein the truck cargo compartment rearwardly of the cab is defined by a horizontal cargo floor, relatively laterally opposed upstanding sides, an upstanding front end wall and a rearwardly opening tail gate, the combination with said truck of a removable passenger compartment comprising an enclosed rearwardly opening tonneau, abutments projecting laterally from the opposite sides of said tonneau and longitudinally slidingly supporting same on the upper edges of said truck sides, with the sides of said tonneau depending interiorly of the truck sides, the lower edges of said tonneau sides respectively being parallel to and spaced above the truck floor to therewith define laterally opposed parallel guide grooves, a closure member being hinged in the open rear end of said tonneau and swingable to a closed position wherein it cooperates with the truck tail gate to completely close the rear of said tonneau, a false floor panel longitudinally slidable in said grooves into and from the truck through the rear end thereof, a plurality of seats secured to said false floor panel and slidable therewith through the rear end of said tonneau, and clamp means carried by said tonneau for cooperation with the truck sides to prevent vertical movement of the tonneau and false floor panel when the truck is in motion, said false floor and tonneau extending between the respective ends of the truck cargo compartment and being restrained against endwise movement thereby when the tailgate is closed.

2. In a truck of the class wherein the truck cargo compartment rearwardly of the cab is defined by a horizontal cargo floor, relatively laterally opposed upstanding sides, an upstanding front end wall, and a rear end closure member, the combination with said truck of a rearwardly opening enclosed tonneau having sides and a front end depending interiorly of the truck cargo compartment sides and front end respectively, abutments projecting laterally outwardly from the opposite sides of said tonneau and longitudinally slidably supporting same on the upper edges of said compartment sides, with the lower edges of said tonneau sides respectively being parallel to and spaced above the truck floor to therewith define laterally opposed parallel guide grooves, a false floor panel longitudinally slidable in said grooves into and from the truck through the rear end of said cargo compartment, a plurality of seats secured to said false floor panel and slidable therewith through the rear end of said tonneau, and clamp means carried by said tonneau for cooperation with the truck sides to prevent vertical movement of the tonneau and false floor panel when the truck is in motion.

ALBERT A. RANDOLPH.

REFERENCES CITED

The following references are of record in the file of this patent:

UNITED STATES PATENTS

| Number | Name | Date |
|---|---|---|
| 2,173,076 | Stetson | Sept. 12, 1939 |